(12) United States Patent
Smirnov et al.

(10) Patent No.: US 10,865,678 B2
(45) Date of Patent: Dec. 15, 2020

(54) METHODS AND SYSTEMS FOR AN EXHAUST GAS AFTERTREATMENT ARRANGEMENT

(71) Applicant: Ford Global Technologies, LLC, Dearborn, MI (US)

(72) Inventors: Evgeny Smirnov, Aachen (DE); Robert Ukropec, Herzogenrath (DE); Dirk Roemer, Cologne (DE); Maria Armiento, Aachen (DE); Jan Harmsen, Simpelveld (NL)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/290,728

(22) Filed: Mar. 1, 2019

(65) Prior Publication Data

US 2019/0277174 A1    Sep. 12, 2019

(30) Foreign Application Priority Data

Mar. 8, 2018   (DE) .................. 10 2018 203 495

(51) Int. Cl.
*F01N 3/08*   (2006.01)
*F01N 3/20*   (2006.01)
(Continued)

(52) U.S. Cl.
CPC ......... *F01N 3/0885* (2013.01); *F01N 3/2066* (2013.01); *F01N 9/00* (2013.01); *F01N 11/007* (2013.01); *F02D 41/028* (2013.01); *F01N 2270/00* (2013.01); *F01N 2430/06* (2013.01); *F01N 2560/025* (2013.01); *F01N 2570/14* (2013.01); *F01N 2610/146* (2013.01); *F01N 2900/1402* (2013.01); *F01N 2900/1602* (2013.01); *F02D 2200/0802* (2013.01)

(58) Field of Classification Search
CPC .... F01N 11/00; F01N 11/007; F01N 13/0093; F01N 3/0814; F01N 3/0842; F01N 3/0885; F01N 3/108; F01N 3/2066; F01N 3/22; F01N 9/00; F01N 2270/00; F01N 2430/06; F01N 2560/025; F01N 2570/14; F01N 2610/146; F01N 2900/1402; F01N 2900/1602; F02D 41/028; F02D 2200/0802

See application file for complete search history.

(56) References Cited

U.S. PATENT DOCUMENTS 5,400,591 A *  3/1995  Aramaki .................. F01N 3/22
                                                  60/274
6,293,094 B1 *  9/2001  Schmidt ................ F01N 3/0814
                                                  60/284

(Continued)

FOREIGN PATENT DOCUMENTS

GB        2418377 A     3/2006
KR      100962812 B1    6/2010

*Primary Examiner* — Brandon D Lee
(74) *Attorney, Agent, or Firm* — Geoffrey Brumbaugh; McCoy Russell LLP

(57) ABSTRACT

Methods and systems are provided for an exhaust gas arrangement. In one example, a system comprises an air supply device arranged between a first LNT and a second LNT. The air supply device positioned to adjust an air/fuel ratio and a temperature of exhaust gas flowing to the second LNT and devices downstream thereof.

18 Claims, 6 Drawing Sheets

(51) Int. Cl.
*F01N 9/00* (2006.01)
*F01N 11/00* (2006.01)
*F02D 41/02* (2006.01)

(56) References Cited

U.S. PATENT DOCUMENTS

| | | |
|---|---|---|
| 7,062,904 B1 | 6/2006 | Hu et al. |
| 7,162,861 B2 | 1/2007 | Khair |
| 7,950,226 B2 | 5/2011 | McCarthy, Jr. et al. |
| 9,453,443 B2 | 9/2016 | Kumar et al. |
| 2004/0076565 A1* | 4/2004 | Gandhi ............... F01N 3/108 423/235 |
| 2010/0236224 A1 | 9/2010 | Kumar et al. |
| 2017/0016368 A1* | 1/2017 | Adam ............... F01N 11/007 |
| 2017/0363029 A1 | 12/2017 | Boerenson et al. |

* cited by examiner

METHODS AND SYSTEMS FOR AN EXHAUST GAS AFTERTREATMENT ARRANGEMENT

CROSS REFERENCE TO RELATED APPLICATION

The present application claims priority to German Patent Application No. 102018203495.8, filed Mar. 8, 2018. The entire contents of the above-listed application are hereby incorporated by reference for all purposes.

FIELD

The present description relates generally to an exhaust gas arrangement comprising a first lean $NO_x$ trap upstream of a second lean $NO_x$ trap with an injector positioned therebetween.

BACKGROUND/SUMMARY

Reduction of $NO_x$ is of increasing concern as emission guidelines become more stringent. Types of emission treatments may include nitrogen oxide storage catalysts, also known as NSR catalysts, (e.g., $NO_x$ storage and reduction catalyst) or a lean $NO_x$ trap (LNT) may represent one of two exemplary aftertreatment devices for the catalytic conversion of nitrogen oxides. An alternative technology may include a selective catalytic reduction (SCR) device, which may utilize a reductant solution applied thereon to reduce nitrogen oxides.

LNT catalytic converters may store nitrogen oxides at low temperatures, relative to the SCR device, and the storage capacity increases up to temperatures of approximately 200 to 250° C. The adsorbed, (e.g., stored nitrogen oxides) can then be reduced to form nitrogen, by the LNT catalytic converter being flushed using a rich exhaust gas mixture ($\lambda<1$) at higher temperatures. Hydrocarbons contained in the rich mixture and also carbon monoxide and hydrogen act as the reducing agents in this case.

In contrast, at high temperatures (e.g., above 300° C.), as can occur, for example, during full-load operation of the internal combustion engine, the storage capacity for nitrogen oxides decreases again. The use of a single LNT catalytic converter may therefore be insufficient in a range of operating conditions to reduce the nitrogen oxide emissions to a threshold output based on a regulatory standard.

To further reduce the nitrogen oxide emission into the environment, the use of so-called dual-LNT catalytic converters is known, which comprise two LNT catalytic converter units arranged in series one after another. Such a dual-LNT catalytic converter enables the storage of nitrogen oxides with a greater variation of the operating conditions, since the second LNT catalytic converter unit of the dual-LNT catalytic converter is arranged farther away from the internal combustion engine, for example, in the region of the underbody of a motor vehicle. The temperature of the exhaust gas stream has already sunk enough upon reaching the second LNT catalytic converter unit that nitrogen oxides can be effectively stored in the second LNT catalytic converter unit. The proportion of total converted nitrogen oxides can thus be elevated, and therefore the nitrogen oxide emission into the environment is reduced overall. However, for example, after a cold start of the internal combustion engine, the problem exists that a minimum temperature, the so-called light-off temperature, of the LNT catalytic converter for the storage and/or conversion of nitrogen oxides is not yet reached. This relates in particular to the second LNT catalytic converter unit arranged farther away from the internal combustion engine.

Moreover, the use of a dual-LNT catalytic converter enables an active SCR catalytic converter, which demands a separate tank for providing a urea solution, to be optionally dispensed with and/or omitted. By doing this, packaging space may be saved and manufacturing costs may be reduced.

To maintain the functionality of the dual-LNT catalytic converter, a regeneration of the two LNT catalytic converter units is desired, for example, by supplying a rich exhaust gas mixture as described above. The second LNT catalytic converter unit, (e.g., the one arranged downstream of the first LNT catalytic converter unit), can be regenerated, for example, by setting the composition and supply of the exhaust gas mixture such that a rich exhaust gas mixture is also still present downstream of the first LNT catalytic converter unit. An accurate monitoring of the regeneration of the second LNT catalytic converter unit is complicated, however, since the composition of the exhaust gas mixture reaching the second LNT catalytic converter unit is dependent on the processes running in the first LNT catalytic converter storage unit. If, for example, a rich exhaust gas mixture is supplied to the second LNT catalytic converter unit for an excessively long duration, an undesired slip of carbon monoxide and hydrocarbons out of the second LNT catalytic converter unit can occur.

After the second LNT catalytic converter unit of the dual-LNT catalytic converter, an SCR catalytic converter can be arranged if desired, which is used to convert ammonia contained in the exhaust gas mixture. For example, this ammonia can arise upon the reduction of the nitrogen oxides in the dual-LNT catalytic converter, for example, during the regeneration. Moreover, the SCR catalytic converter offers an additional conversion option for nitrogen oxides, and therefore the nitrogen oxide emission into the environment can be reduced further.

In contrast to the sole use of an active SCR catalytic converter, which is optimized for a use with a lean exhaust gas mixture, the combined system of LNT catalytic converter and SCR catalytic converter is subjected at least temporarily to a rich exhaust gas mixture during the regeneration of the LNT catalytic converter.

The temporary operation using a rich exhaust gas mixture causes a reducing agent slip. In other words, the rich exhaust gas mixture also reaches the SCR catalytic converter arranged downstream of the LNT catalytic converter. This rich exhaust gas mixture has a negative effect on the performance of the SCR catalytic converter and may hamper its ability to treat nitrogen oxides, as prevail during the desulfurization/desulfation (DeSOx). This impairment of the performance of the SCR catalytic converter may be permanent and is based on the deactivation of the catalytic converter material, for example, as a result of sintering procedures, and/or the reduction of copper in the SCR catalytic converter.

The inventors have recognized the above issues and come up with a way to solve them. In one example, the issues described above may be addressed by a system comprising a first lean $NO_x$ trap arranged upstream of a second lean $NO_x$ trap in an exhaust passage, an air supply device arranged between the first and second lean $NO_x$ traps, and a controller with computer-readable instructions stored on non-transitory memory thereof that when executed enable the controller to adjust an air flow from the air supply device during a regeneration of the first lean $NO_x$ trap. In this way, the second LNT may be selectively regenerated in response to the first LNT being regenerated.

As one example, the air supply device is positioned to adjust a temperature and composition of exhaust gas flowing to the second LNT and devices downstream thereof. In one example, this may include leaning exhaust gas during a regeneration of the first LNT. In another example, this may include leaning exhaust gas to create an exothermic reaction to increase a temperature of the second LNT to a regeneration temperature. Additionally or alternatively, this may include cooling exhaust gas to decrease a temperature of the second LNT. The air supply device may further adjust the exhaust gas composition and/or temperature in response to demands of devices downstream of the second LNT. For example, the exhaust gas may be leaned based on a SCR device demand to mitigate degradation to the SCR device. By doing this, rich operation of the engine may be extended, which may improve drivability and performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for injecting air between a first LNT device and a second LNT device. The air injection may adjust a temperature and composition of the exhaust gas, wherein if the exhaust gas is rich, the air injection may increase its temperature and if the exhaust gas lean, the air injection may decrease its temperature. The air injection may be desired in response to conditions of the second LNT device or of an SCR device arranged downstream of the second LNT device. For example, the air injection may be desired in response to the first LNT device being regenerated, wherein a rate of air flow from an injector configured to execute the air injection is set to block reductants (e.g., hydrocarbons and the like) from flowing downstream of the second LNT device.

Figure 1:
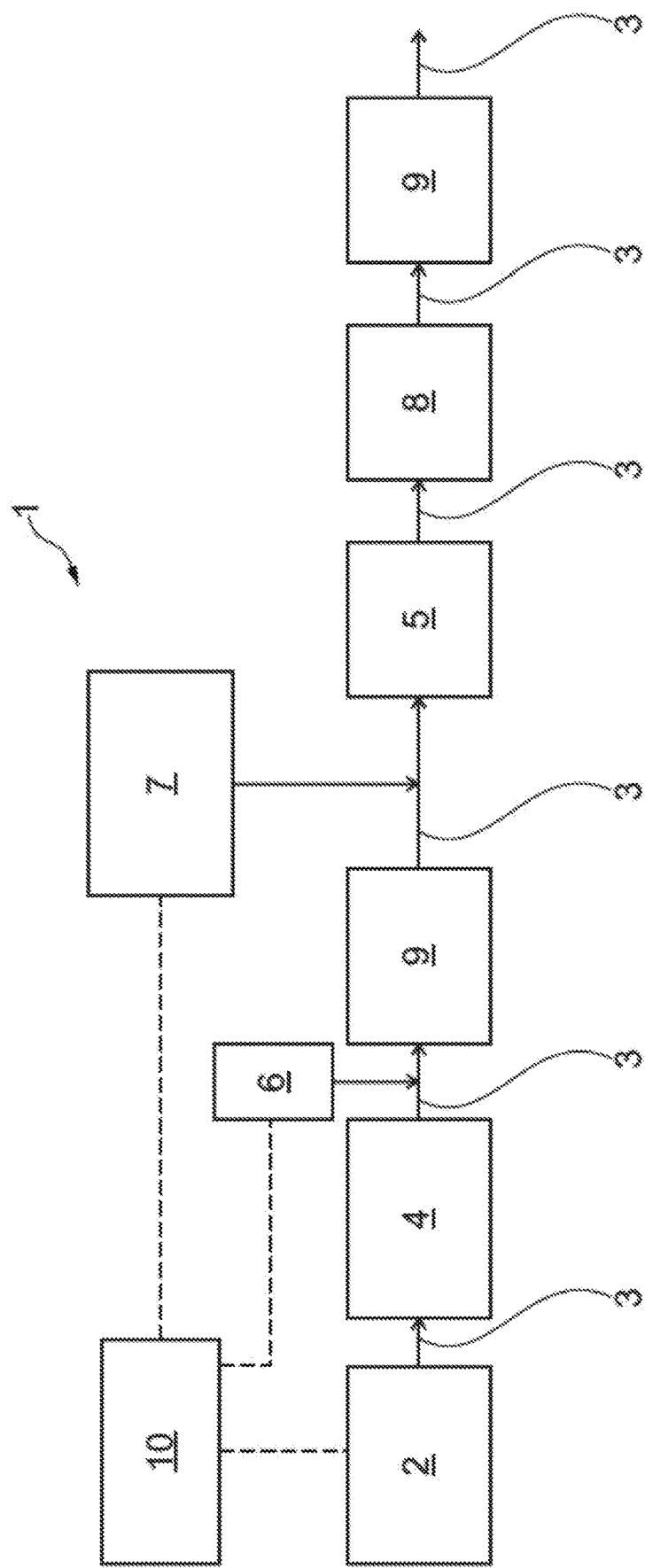
FIG. 1 shows an arrangement for the accommodation and post-treatment of an exhaust gas stream produced by an internal combustion engine in an exemplary embodiment together with an internal combustion engine
Figure 2:
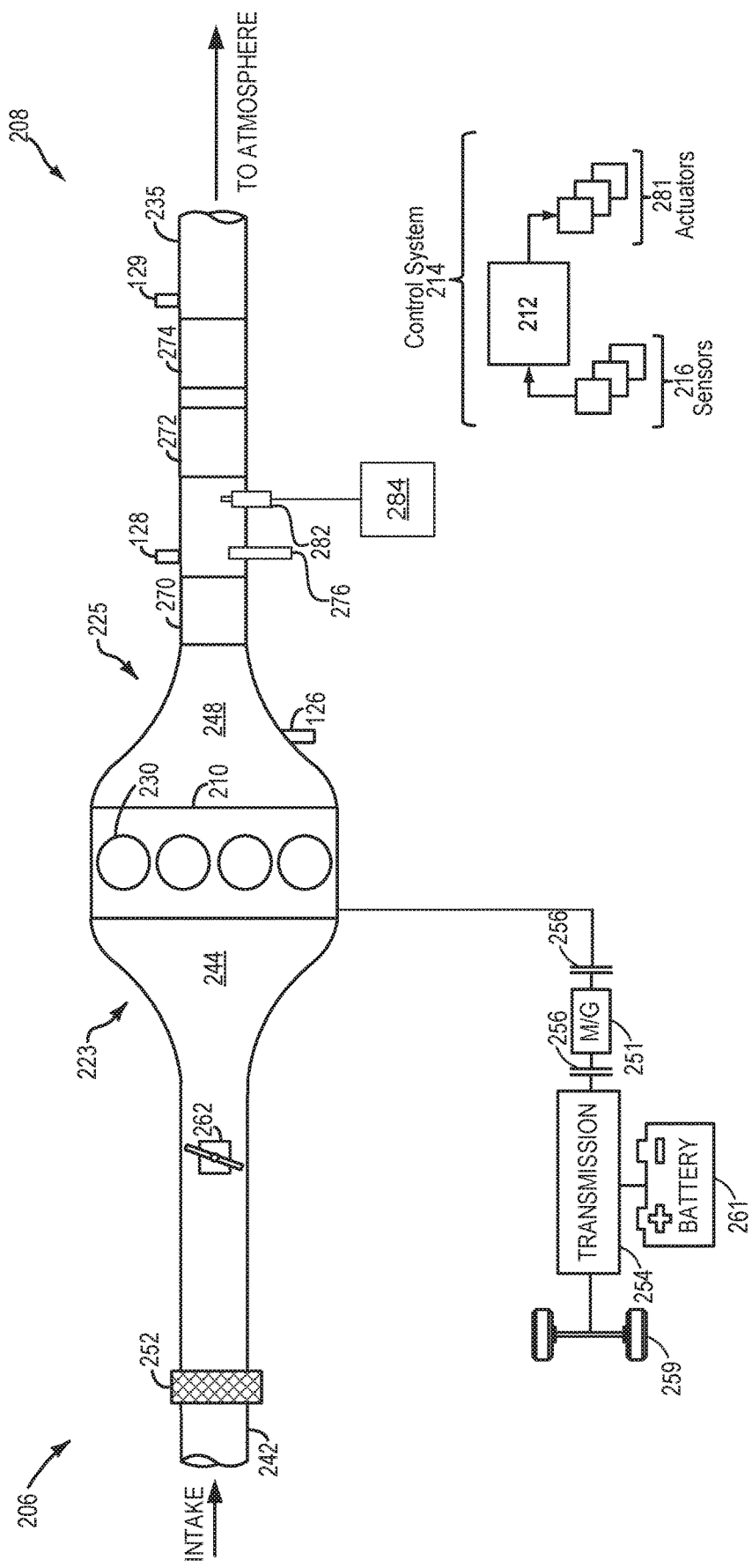
FIG. 2 illustrates a schematic of an engine included in a hybrid vehicle.
Figure 3A:
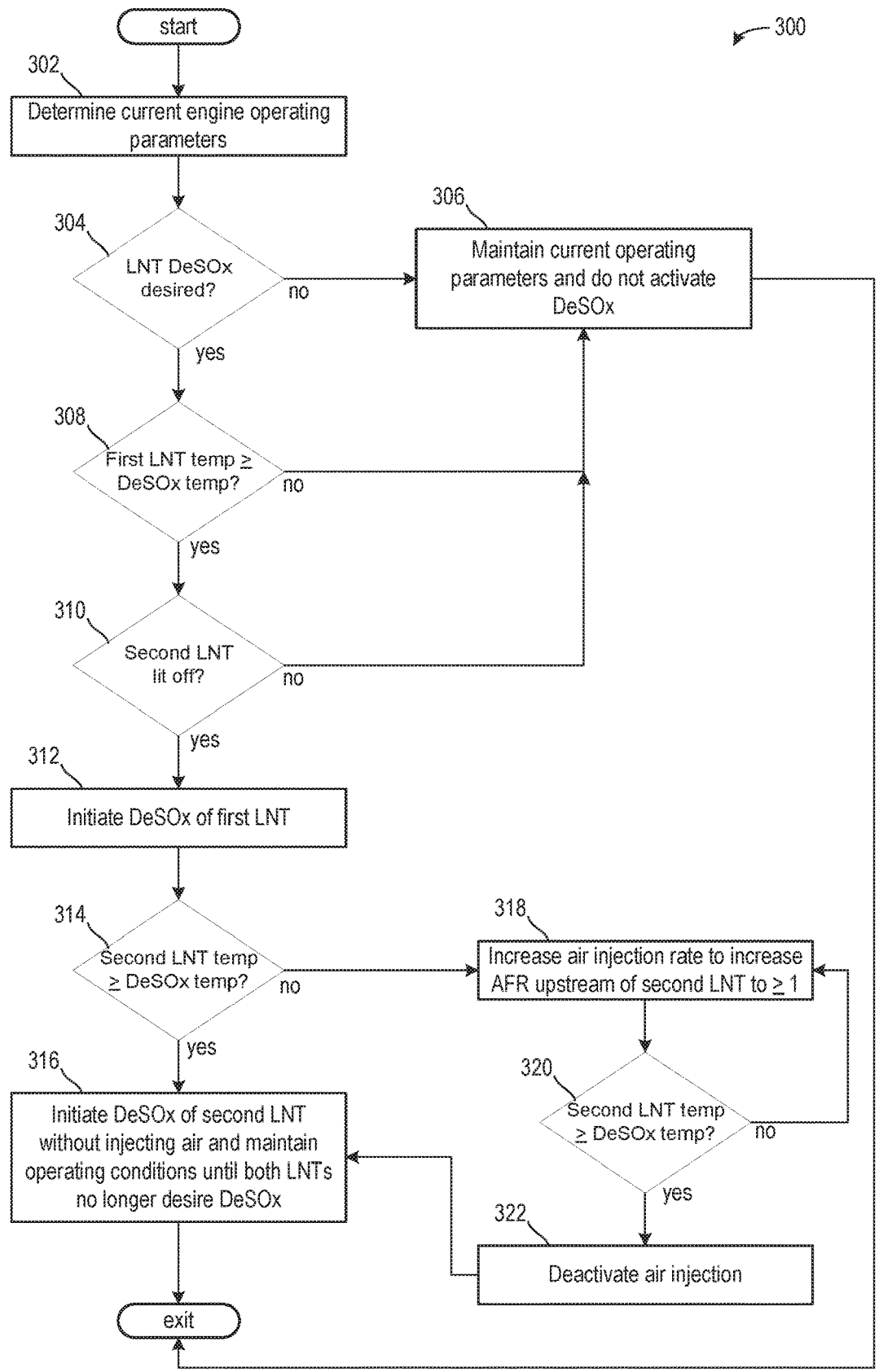
FIGS. 3A and 3B illustrate methods for injecting air into the exhaust passage based on a second LNT device demand downstream of a first LNT device.
Figure 3B:
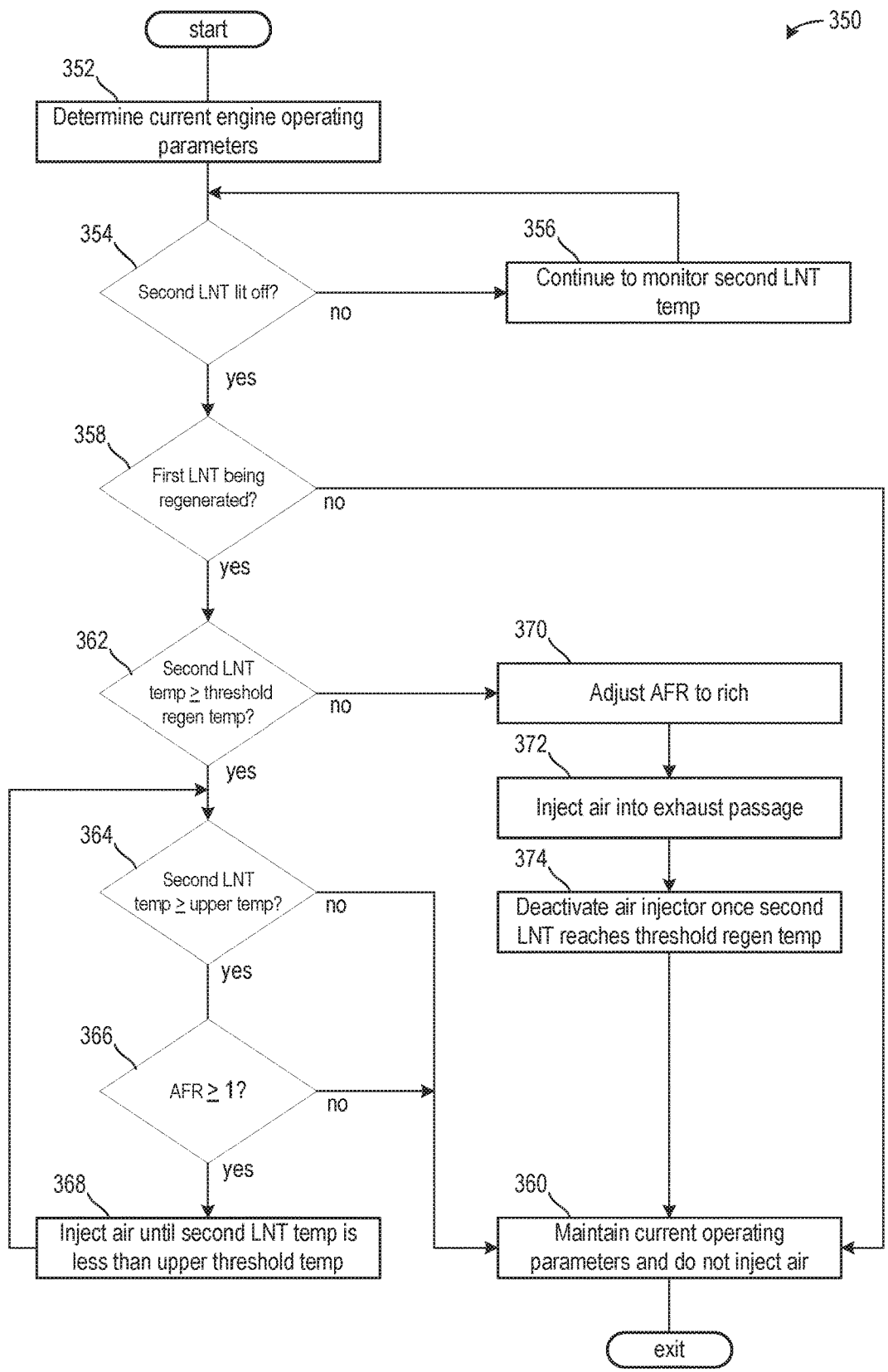
Figure 4:
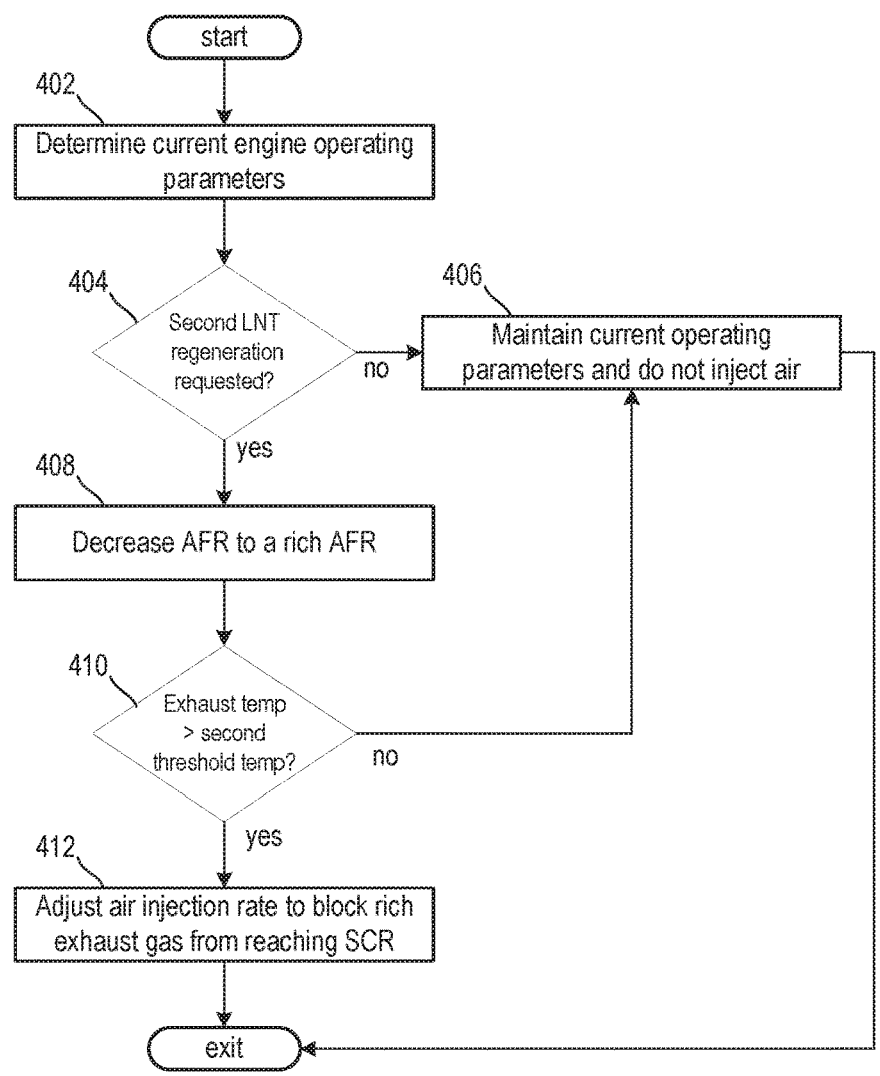
FIG. 4 illustrates a method for injecting air into the exhaust passage based on a SCR device arranged downstream of the second LNT device
Figure 5:
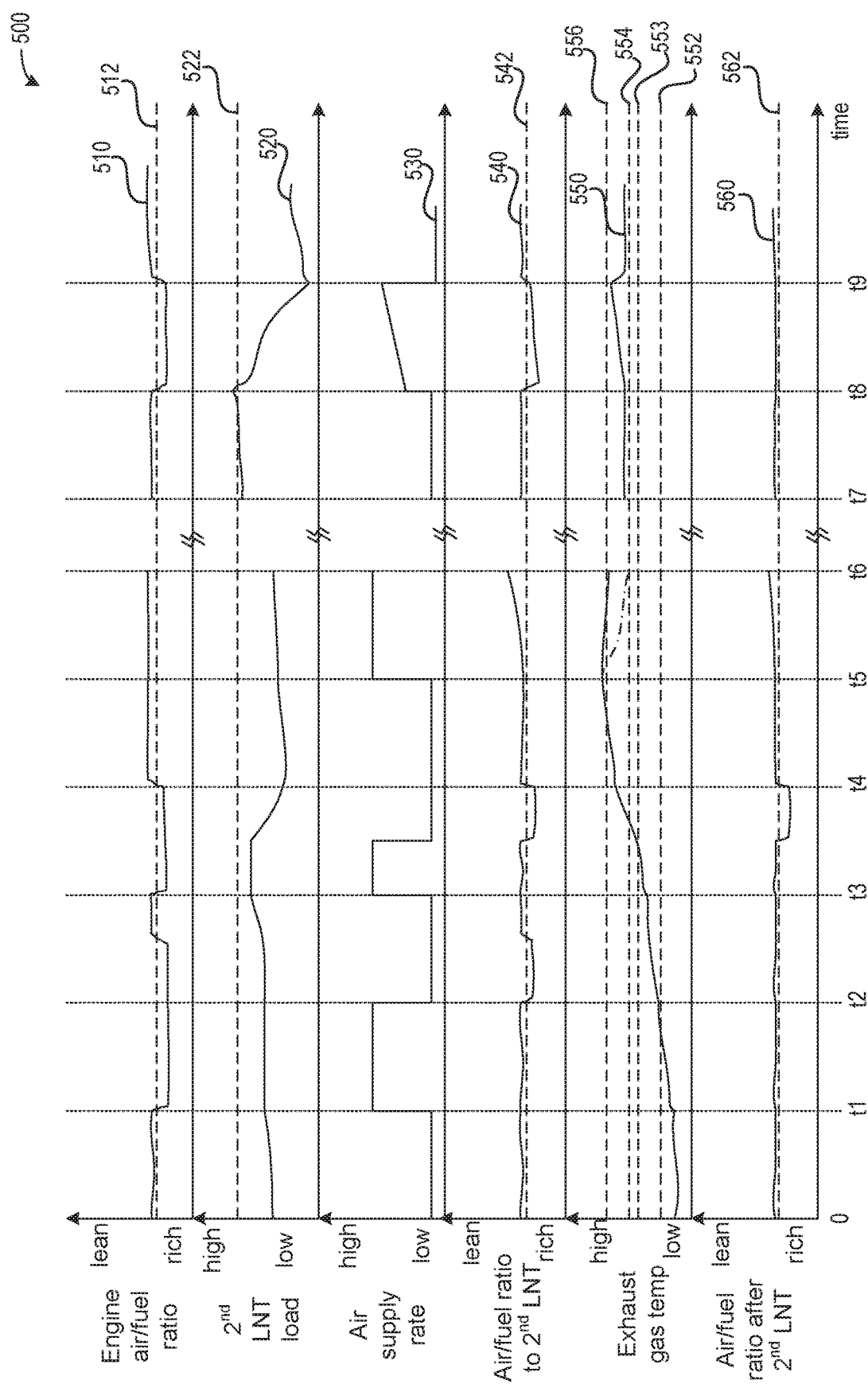
FIG. 5 illustrates a prophetic engine operating sequence relating engine operating parameters and exhaust passage air injections.

An example of the first LNT, the second LNT, the SCR device, and an air supply device are shown in FIGS. 1 and 2. Methods illustrating air injection conditions in response to a second LNT demand and an SCR device demand are shown in FIGS. 3A, 3B, and 4. A graph illustrating a prophetic engine operating sequence is illustrated in FIG. 5.

The present disclosure is based on a quantity of oxygen available downstream of a first LNT catalytic converter unit of a dual-LNT catalytic converter and upstream of a second LNT catalytic converter of the dual-LNT catalytic converter during the regeneration of the dual-LNT catalytic converter by supplying a rich exhaust gas mixture is approximately zero.

The present disclosure is directed to arranging an air supply device downstream of the first LNT catalytic converter unit and upstream of the second LNT catalytic converter unit, (e.g., between the two LNT catalytic converter units) so that air and therefore also oxygen contained in the air can be supplied to the exhaust gas stream.

An arrangement according to the present disclosure for the accommodation and post-treatment of an exhaust gas stream produced by an internal combustion engine comprises a dual-LNT catalytic converter having a first LNT catalytic converter unit and a second LNT catalytic converter unit arranged downstream of the first LNT catalytic converter unit, a lambda sensor arranged downstream of the first LNT catalytic converter unit and upstream of the second LNT catalytic converter unit, and an air supply device arranged downstream of the first LNT catalytic converter unit and upstream of the second LNT catalytic converter unit. In other words, the following sequence results: first LNT catalytic converter unit of the dual-LNT catalytic converter, lambda sensor and air supply device, second LNT catalytic converter unit of the dual-LNT catalytic converter. Further devices can optionally be arranged between the LNT catalytic converter units. In one example, additionally or alternatively, the first LNT catalytic converter is in a close-coupled position relative to the engine. The second LNT catalytic converter is in a far vehicle underbody position. As such, exhaust gas temperatures at the first LNT catalytic converter may be greater than exhaust gas temperature at the second LNT catalytic converter.

Herein, upstream and downstream relate to the flow direction of the exhaust gas stream originating from the internal combustion engine in the direction of the exhaust pipe. As such, the first LNT catalytic converter is upstream of the second LNT catalytic converter, which results in exhaust gas contacting the first LNT catalytic converter before it contacts the second LNT catalytic converter.

An embodiment comprises where the air supply device is arranged downstream of the lambda sensor to be able to set the air supply in accordance with the combustion air ratio of the exhaust gas stream leaving the first LNT catalytic converter unit. The air supply device is arranged immediately upstream of the second LNT catalytic converter unit, to be able to set the combustion air ratio of the exhaust gas stream flowing into the second LNT catalytic converter unit directly and as accurately as possible, without an influence due to further devices being present, for example, further exhaust gas post-treatment devices. That is to say, if other exhaust gas post-treatment devices are arranged between the first LNT catalytic converter and the second LNT catalytic converter, the air supply device is arranged in a location upstream of the second LNT catalytic converter where there may be no intervening components between the air supply device and the second LNT catalytic converter.

An internal combustion engine, sometimes also referred to as a combustion engine, is to be understood as an internal combustion machine for converting chemical energy contained in fuel into mechanical work. The internal combustion engine can be configured, for example, as a self-igniting or externally-ignited internal combustion engine. For example, engine gasoline or diesel can be used as the fuel. Specified flow directions relate to the flow direction of the exhaust gas stream from the internal combustion engine in the direction of the exhaust. A turbocharger can optionally be associated with the internal combustion engine.

The devices of the arrangement according to the present disclosure are arranged in an exhaust system which is formed by an exhaust line, through which the exhaust gas stream flows and in which the catalytic converters and sensors are arranged, and therefore the exhaust gas stream can also flow through the catalytic converters and the properties of the exhaust gas stream, for example, its composition, temperature, etc., can be determined via the sensors.

A lambda sensor is defined herein as a sensor which supplies measurement signals, from which the combustion air ratio $\lambda$ is ascertained, (e.g., the ratio of the air mass actually available for combustion to the stoichiometric air mass which is a minimum used for complete combustion). The lambda sensor can be configured, for example, as a lambda probe, which compares the residual oxygen content in the exhaust gas to the oxygen content of the instantaneous atmospheric air, from which the combustion air ratio can be ascertained. The lambda sensor can also be configured as a nitrogen oxide sensor, since such nitrogen oxide sensors can also output the combustion air ratio, in addition to the determination of the nitrogen oxide component.

The air supply device is configured for supplying air, for example, ambient air or air from a supply air line of the internal combustion engine or of a turbocharger, to the exhaust gas stream. The volume flow of the air to be supplied can be set discontinuously, (e.g., air supply either turned on or off), or can be set continuously from zero up to a maximum volume stream. The air supply device can be formed, for example, by a pump and a valve or an injector. The air supply device can be connected to a supply air line of the internal combustion engine, from which air can be supplied via a valve or an injector to the exhaust gas stream. For example, air of a turbocharger can be supplied to the exhaust gas stream. The air supply line may be, additionally or alternatively, fluidly coupled to a brake booster, vacuum generating device, or other device that stores and moves air. Additionally or alternatively, an auxiliary pump may be coupled to the supply air line, wherein the pump is shaped to direct ambient air through the supply air line.

The arrangement can optionally comprise a mixing device for mixing the supplied air with the exhaust gas stream. In this way, the composition of the exhaust gas stream reaching the second LNT catalytic converter unit may be more homogenous.

The arrangement according to the disclosure enables an air supply to the exhaust gas stream in dependence on the combustion air ratio ascertained via the lambda sensor downstream of the first LNT catalytic converter unit, (e.g., the combustion air ratio of the exhaust gas stream leaving the first LNT catalytic converter unit). This advantageously enables a setting of the combustion air ratio of the exhaust gas stream flowing into the second LNT catalytic converter unit and thus also indirectly of the combustion air ratio of the exhaust gas stream leaving the second LNT catalytic converter unit.

For example, air can be supplied to the exhaust gas stream via the air supply device if a combustion air ratio less than one (e.g., a rich exhaust gas mixture) is detected downstream of the first LNT catalytic converter unit via the lambda sensor. This can be the case, for example, during or after a regeneration of the first LNT catalytic converter unit via a rich exhaust gas mixture.

The control or regulation of the air supply can take place such that a combustion air ratio of at least one is obtained, (e.g., a stoichiometric or lean exhaust gas mixture is supplied to the second LNT catalytic converter unit). Under these conditions, the second LNT catalytic converter unit is capable of effectively storing nitrogen oxides, and therefore the nitrogen oxide emission into the environment is reduced. Overall, the proportion of converted nitrogen oxides can be elevated, which therefore can no longer be emitted to the environment in the form of nitrogen oxides.

The enlargement of the temperature range for the storage of nitrogen oxides, which is linked to the arrangement of a dual-LNT catalytic converter, may be realized via incorporation of the air supply device. Moreover, an undesired release of carbon monoxide and hydrocarbons from the second LNT catalytic converter unit can be substantially avoided.

Furthermore, air can be supplied via the air supply device to cause an exothermic reaction between rich components of the exhaust gas mixture and the oxygen of the supplied air. The thermal energy released during such a reaction can be used to heat the exhaust gas stream and to heat the second LNT catalytic converter unit and possibly subsequent catalytic converters or further exhaust gas post-treatment devices. In other words, the air supply device can be used to induce an exothermic reaction, which results in heating of the second LNT catalytic converter unit.

This is particularly advantageous if the second LNT catalytic converter unit is arranged far away from the first LNT catalytic converter unit, for example, in the region of the far underbody of a motor vehicle. Rapidly reaching the regeneration temperature can be enabled in this way, and therefore nitrogen oxides can be effectively removed from the exhaust gas stream, for example, after a cold start of the internal combustion engine.

In addition, an elevation of the combustion air ratio of the exhaust gas stream reaching the second LNT catalytic converter unit to values greater than one can reduce or even prevent an undesired desorption of nitrogen oxides. Such a desorption may otherwise occur in a first phase of a regeneration of the first LNT catalytic converter unit via a rich exhaust gas mixture, during which the combustion air ratio of the exhaust gas flowing to the second LNT is typically about one and reductants are not present in the exhaust gas for a conversion of the stored nitrogen oxides into nitrogen. In other words, the supply of a rich mixture for regenerating the second LNT catalytic converter unit is actually desired, however, initially oxygen can advantageously be supplied in a starting phase of the regeneration in order to prevent a creeping transition from lean to rich and then be able to switch over suddenly from lean to rich conditions by ending the air supply.

The first LNT regeneration may comprise where a temperature of exhaust gas reaching the second LNT is too low to regenerate the LNT, resulting in unabated release of hydrocarbons and carbon monoxide therethrough. As such, it may be desired to activate the air supply device to adjust the air/fuel ratio of exhaust gas flowing to the second LNT to a stoichiometric or lean air/fuel ratio until the second LNT temperature is high enough for regeneration. Once the temperature is greater than a regeneration temperature, then the air flow rate of the air supply device may be adjusted to zero and the second LNT allowed to regenerate.

According to various embodiment variants, the arrangement can furthermore comprise an SCR catalytic converter arranged downstream of the second LNT catalytic converter unit. The SCR catalytic converter can optionally also comprise a particle filter functionality and can be configured as an SDPF catalytic converter, (e.g., as a particle filter having SCR functionality).

The SCR catalytic converter may convert nitrogen oxides contained in the exhaust gas stream, and therefore the nitrogen oxide emission into the environment can be reduced further. Moreover, the SCR catalytic converter is capable of converting ammonia contained in the exhaust gas stream, and therefore an emission of ammonia to the environment can also be prevented or at least reduced. In one embodiment, the SCR catalytic converter can be arranged in the region of the underbody of a motor vehicle.

The additional air supply via the air supply device causes, in addition to the above-described advantages, an elevated nitrogen oxide conversion in the SCR catalytic converter, since additional oxygen is provided. In other words, a synergistic effect results due to the joint use of the air supply device and the SCR catalytic converter.

Furthermore, the air supply via the air supply device can contribute to lengthening the service life of the SCR catalytic converter, by minimizing its aging at high temperature. By way of suitable air supply, it is possible to prevent a rich exhaust gas mixture from reaching the SCR catalytic converter and inducing irreversible damage therein in conjunction with high temperatures. In one example, the air supply device is activated in response rich exhaust gas above a threshold temperature to prevent the hot, rich exhaust gas from reaching the SCR catalytic converter.

According to further embodiment variants, the arrangement can furthermore comprise one or more exhaust gas post-treatment devices arranged downstream of the first LNT catalytic converter unit and upstream of the second LNT catalytic converter unit and/or downstream of the SCR catalytic converter. Exhaust gas post-treatment devices arranged between the first and second LNT catalytic converter units are preferably arranged in this case downstream of the lambda sensor and upstream or downstream of the air supply device.

The exhaust gas post-treatment devices can be configured, for example, as particle filters or oxidation catalytic converters. The arrangement of the exhaust gas post-treatment devices contributes to improve exhaust gas purification and reduces the release of air pollutants into the environment.

According to further embodiment variants, the arrangement can comprise a temperature sensor arranged upstream of the second LNT catalytic converter unit. This sensor is used for the temperature determination of the exhaust gas stream. The temperature of the second LNT catalytic converter unit can be concluded indirectly from the temperature of the exhaust gas stream.

Optionally, air can also be supplied if the temperature of the second LNT catalytic converter unit is excessively high under lean conditions. The second LNT catalytic converter unit can be cooled via the supplied air. Cooling of the second LNT catalytic converter unit can also be necessary to enable a storage of nitrogen oxides during the regeneration of a diesel particle filter, which typically demands high temperatures.

According to further embodiment variants, the arrangement can furthermore comprise a control unit, which is configured and designed to output a control signal to the internal combustion engine and/or the air supply device in dependence on sensor signals of the lambda sensor and/or the temperature sensor.

The control unit receives signals of the lambda sensor and/or the temperature sensor as input data, processes these input data, and transmits control signals to the air supply device and/or the internal combustion engine as actuators in reaction to the processed input data based on instructions or a programmed code in accordance with one or more routines.

The air supply device can advantageously be automatically controlled or regulated by means of the control unit, and therefore a rapid change between air supply and no air supply can also be implemented. Furthermore, the volume flow of the air to be supplied via the air supply device can optionally be continuously controlled or regulated.

The control unit can be configured to output a control signal to set the ratio of air to fuel in the air-fuel mixture to be supplied to the internal combustion engine. This ratio has an effect on the composition of the exhaust gas mixture, for example, if the air-fuel mixture to be supplied has a combustion air ratio less than 1, a rich exhaust gas mixture will thus also be produced by the internal combustion engine. The control signal for setting the ratio of air to fuel in the air-fuel mixture to be supplied to the internal combustion engine can also be output in dependence on sensor signals of the lambda sensor and/or the temperature sensor.

The control unit can be implemented in hardware and/or software and can be physically formed in one or multiple parts. In particular, the control unit can be part of an engine controller or can be integrated therein. In a typical embodiment, the engine controller of a motor vehicle functions as the control unit.

A motor vehicle according to the disclosure comprises an arrangement according to the above description. A motor vehicle is to be understood as a vehicle driven by an internal combustion engine, for example, a land, air, or water vehicle. The above statements to explain the arrangement according to the disclosure are thus also used to describe the motor vehicle according to the disclosure. The advantages of the motor vehicle according to the disclosure correspond to those of the arrangement according to the disclosure and the embodiment variants thereof.

According to various embodiment variants, the second LNT catalytic converter unit is arranged in the region of the underbody of the motor vehicle. The SCR catalytic converter can optionally also be arranged in the region of the underbody of the motor vehicle.

An arrangement in the region of the underbody is advantageous because more installation space is available in this region and the limited installation space in the vicinity of the engine is not occupied by the second LNT catalytic converter unit. Moreover, a greater temperature range may be achieved for the storage of nitrogen oxides in the dual-LNT catalytic converter by an arrangement in the region of the underbody, since the temperature of the second LNT catalytic converter unit is lower in comparison to the first LNT catalytic converter unit as a result of the arrangement remote from the engine. The storage of nitrogen oxides can thus take place more effectively, and therefore the emission of nitrogen oxides into the environment is reduced.

A method according to the disclosure for the treatment of an exhaust gas stream produced by an internal combustion engine comprises the following steps: conducting the exhaust gas stream through a first LNT catalytic converter unit of a dual-LNT catalytic converter, ascertaining the combustion air ratio in the exhaust gas stream downstream of the first LNT catalytic converter unit and upstream of a second LNT catalytic converter unit arranged downstream of the first LNT catalytic converter unit, supplying air to the exhaust gas stream downstream of the first LNT catalytic converter unit and upstream of the second LNT catalytic converter unit, and conducting the exhaust gas stream through the second LNT catalytic converter unit.

The air is supplied downstream of the point at which the combustion air ratio is ascertained. In this way, the combustion air ratio to be ascertained is not influenced by the air supply.

The method according to the disclosure can be executed, for example, via the above-explained arrangement according to the disclosure. The above statements to explain the arrangement according to the disclosure are thus also used to describe the method according to the disclosure. The advantages of the method according to the disclosure correspond to those of the arrangement according to the disclosure and the corresponding embodiment variants thereof.

According to various embodiment variants, the method can comprise conducting the exhaust gas stream through an SCR catalytic converter arranged downstream of the second LNT catalytic converter unit.

According to further embodiment variants, the method can comprise treating the exhaust gas stream in one or more exhaust gas post-treatment devices arranged downstream of the first LNT catalytic converter unit and upstream of the second LNT catalytic converter unit and/or downstream of the SCR catalytic converter.

If a treatment is performed in one or more exhaust gas post-treatment devices arranged downstream of the first LNT catalytic converter unit and upstream of the second LNT catalytic converter unit, the combustion air ratio is thus preferably firstly determined, the treatment of the exhaust gas stream then takes place, and the air supply to the exhaust gas stream takes place immediately before the conduction of the exhaust gas stream through the second LNT catalytic converter unit.

According to further embodiment variants, the method can comprise ascertaining the temperature of the exhaust gas stream upstream of the second LNT catalytic converter unit.

According to further embodiment variants, the quantity of air to be supplied to the exhaust gas stream can be controlled or regulated in dependence on the ascertained combustion air ratio and/or in dependence on the ascertained temperature.

For example, the quantity of air to be supplied to the exhaust gas stream can be controlled or regulated such that the exhaust gas stream reaches a minimum temperature, which corresponds to the light-off temperature of the second LNT catalytic converter unit.

The option furthermore exists of controlling or regulating the quantity of air to be supplied to the exhaust gas stream such that the exhaust gas stream reaching the second LNT catalytic converter unit at least temporarily has a combustion air ratio greater than or equal to one. For this purpose, if a rich exhaust gas mixture is present, the desired quantity of air can be ascertained which is necessary to supply the quantity of oxygen to the exhaust gas stream which is necessary to adapt the combustion air ratio.

According to further embodiment variants, a ratio of air to fuel in an air-fuel mixture to be supplied to the internal combustion engine can be controlled or regulated in dependence on the ascertained combustion air ratio and/or in dependence on the ascertained temperature.

If, for example, heating of the second LNT catalytic converter unit is desired, which may be desired if the ascertained temperature is, for example, less than a lower threshold temperature, a ratio of air to fuel less than one can be set, and therefore the internal combustion engine produces a rich exhaust gas mixture and the rich components contained therein can be converted via the supplied air in an exothermic reaction.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it schematically shows an arrangement 1 adjoining an internal combustion engine 2. The internal combustion engine 2 can be configured as a self-igniting engine and can be operated using diesel fuel, for example. Optionally, a turbocharger can be associated with the internal combustion engine 2. The arrangement 1 and the internal combustion engine 2 can be part of a motor vehicle, which may be a hybrid vehicle in one example. Additionally or alternatively, the engine 2 may comprise a spark plug and be configured to as a gasoline engine without departing from the scope of the present disclosure.

The internal combustion engine 2 produces an exhaust gas stream 3, which is accommodated by the arrangement 1 via an exhaust pipe. Described in the flow direction of the exhaust gas stream 3, the arrangement 1 has a first LNT catalytic converter unit 4 of a dual-LNT catalytic converter, a lambda sensor 6, an air supply device 7, a second LNT catalytic converter unit 5 of the dual-LNT catalytic converter, and an SCR catalytic converter 8. Optionally, as shown in FIG. 1, further exhaust gas post-treatment devices 9 can be arranged between the lambda sensor 6 and the air supply device 7 and/or downstream of the SCR catalytic converter 8. Furthermore, optional exhaust gas post-treatment devices 9 can alternatively or additionally be arranged between the air supply device 7 and the second LNT catalytic converter unit 5. The exhaust gas post-treatment devices 9 may be one or more of a particulate filter and an oxidation catalyst.

Furthermore, a temperature sensor (not shown) for ascertaining the temperature of the exhaust gas stream and therefore for indirectly ascertaining the temperature of the second LNT catalytic converter unit 5 can optionally be arranged upstream or downstream of the second LNT catalytic converter unit 5, for example, directly upstream or directly downstream.

The lambda sensor 6, the air supply device 7, and the internal combustion engine 2 and optionally the temperature sensor comprise a signaling connection to the control unit 10. The control unit 10 can output a control signal to the internal combustion engine 2 and/or the air supply device 7 in dependence on sensor signals of the lambda sensor 6 and/or optionally the temperature sensor. In the exemplary embodiment, the control unit 10 forms a part of the engine controller. However, it can also be designed as a separate control unit.

For the treatment of the exhaust gas stream 3 produced by the internal combustion engine 2, it is firstly conducted through the first LNT catalytic converter unit 4. Under normal conditions, i.e., the LNT catalytic converter units 4, 5 still have sufficient storage space for storing nitrogen oxides and the temperature thereof is in an optimum range above the light-off temperature, the exhaust gas stream 3 has a lean exhaust gas mixture, and therefore nitrogen oxides contained therein can be stored in the first LNT catalytic converter unit 4. The combustion air ratio $\lambda$ in the exhaust gas stream 3, which is greater than one under normal conditions, is determined downstream of the first LNT catalytic converter unit by means of the lambda sensor 6.

Under a range of engine operating conditions, an air supply to the exhaust gas stream 3 may not be desired and the exhaust gas stream is conducted into the second LNT catalytic converter unit 5, wherein nitrogen oxides can again be stored. Subsequently, the exhaust gas stream 3 is conducted through the SCR catalytic converter 8 and thereafter, possibly after further post-treatment, emitted to the environment.

If the conditions deviate from the normal conditions, for example, the temperature of the second LNT catalytic converter unit 5 is below a light-off temperature and a combustion air ratio $\lambda$ less than one is detected downstream of the first LNT catalytic converter unit, a supply of air to the exhaust gas stream 3 may be desired.

For example, during the first LNT catalytic converter unit 4 regeneration, air can be supplied to the exhaust gas stream 3 via the air supply device 7 if the temperature of the second LNT catalytic converter unit 5 was below the regeneration temperature immediately before the first LNT regeneration start. This can be ascertained, for example, by ascertaining the temperature of the exhaust gas stream 3 upstream of the second LNT catalytic converter unit 5, since the temperature of the second LNT catalytic converter unit 5 may be concluded from the temperature of the exhaust gas stream 3 before influence of exothermic effect from the first LNT regeneration on the exhaust gas temperature.

In addition, the ratio of air to fuel in the air-fuel mixture to be supplied to the internal combustion engine 2 can be controlled such that it is less than one and the internal combustion engine 2 therefore produces a rich exhaust gas stream 3. The rich components contained in the exhaust gas stream 3 can then undergo a catalytic exothermic reaction with the oxygen contained in the supplied air. The released thermal energy heats the second LNT catalytic converter unit 5 and the exhaust gas stream 3 downstream of the second LNT catalytic converter unit 5. As soon as the second LNT catalytic converter unit 5 has reached a minimum temperature, an air supply rate may be reduced or deactivated and a lean air-fuel mixture can again be supplied to the internal combustion engine 2.

Air can also be supplied via the air supply device 7 to the exhaust gas stream 3, for example, if a combustion air ratio $\lambda$ less than one is detected downstream of the first LNT catalytic converter unit 4. This can be the case, for example, during a regeneration of the first LNT catalytic converter unit 4, since a rich exhaust gas mixture is to be supplied to the first LNT catalytic converter unit 4 for this purpose. To block such a rich exhaust gas mixture from reaching the SCR catalytic converter 8 arranged downstream at high temperatures and inducing irreversible degradation therein, air can be supplied to the exhaust gas stream 3, such that the combustion air ratio $\lambda$ rises to values $\lambda \geq 1$. The air supply can moreover contribute to an improved conversion of nitrogen oxides in the SCR catalytic converter 8. In one example, the rich exhaust gas may degrade the SCR catalytic converter 8 at temperatures greater than a threshold temperature, which may be greater than or equal to 400° C.

FIG. 2 shows a schematic depiction of a hybrid vehicle system 206 that can derive propulsion power from engine system 208 and/or an on-board energy storage device. An energy conversion device, such as a generator, may be operated to absorb energy from vehicle motion and/or engine operation, and then convert the absorbed energy to an energy form suitable for storage by the energy storage device.

Engine system 208 may include an engine 210 having a plurality of cylinders 230. Engine 210 may be used similarly to engine 2 of FIG. 1 in one example. Engine 210 includes an engine intake 223 and an engine exhaust 225. Engine intake 223 includes an air intake throttle 262 fluidly coupled to the engine intake manifold 244 via an intake passage 242. Air may enter intake passage 242 via air filter 252. Engine exhaust 225 includes an exhaust manifold 248 leading to an exhaust passage 235 that routes exhaust gas to the atmosphere. Engine exhaust 225 may include one or more emission control devices 270 mounted in a close-coupled or far vehicle underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 208 is a boosted engine system, the engine system may further include a boosting device, such as a turbocharger (not shown).

In one example, the emission control device 270 is a first emission control device arranged upstream of a second emission control device 272 relative to a direction of exhaust gas flow. A lambda sensor 276 may be arranged at a junction between the first emission control device 270 and the second emission control device 272. Additionally or alternatively, a temperature sensor 128 may also be arranged between the first emission control device and the second emission control device. Feedback from either of the lambda sensor 276 or the temperature sensor 128 may indicate a temperature and oxygen content of exhaust gas upstream of the second emission control device 272.

The first emission control device 270 may be shown in a close-coupled position and the second emission control device 272 may be shown in a vehicle far-underbody position. As such, exhaust gas temperatures may be hotter at the first emission control device 270 than the second emission control device 272. In one example, exhaust gas temperatures are 30% cooler at the second emission control device 272 than the first emission control device 270. Additionally or alternatively, exhaust gas temperatures are 50% cooler at the second emission control device 272 than the first emission control device 270.

In one example, the first emission control device 270 is a LNT and the second emission control device 272 is a LNT identical to the LNT of the first emission control device 270. In one example, the first emission control device 270 is used similarly to the first LNT catalytic converter device 4 of FIG. 1 and the second emission control device 272 is used similarly to the second LNT catalytic converter device 5 of FIG. 1. Herein, the first emission control device 270 is referred to as a first LNT 270 and the second emission control device 272 is referred to as a second LNT 272.

An injector 282 may receive air from an air supply device 284. In one example, the air supply device 284 is an auxiliary device, such as a pump, and functions to only provide air to injector 282. Additionally or alternatively, the air supply device 284 may be a device already arranged onboard the vehicle 206, wherein the air supply device 284 is one or more of a compressor, a brake booster, and a vacuum generating device. The air supply device 284 may be other onboard components suitable for flowing air to an exhaust passage.

As shown, the injector 282 is positioned to inject directly into the exhaust passage between the first LNT 270 and the second LNT 272. More specifically, the injector 282 is positioned downstream of the lambda sensor 276 such that an injection of air may not alter feedback from the lambda sensor 276. In some examples, an exhaust gas mixer may be arranged between the injector 282 and the second LNT 272. As described above and as will be described in greater detail below with respect to FIGS. 3A, 3B, 4, and 5, the injector 282 may be activated to adjust an air/fuel ratio of exhaust gas flowing to the second LNT or a temperature of the second LNT.

A third emission control device 274 may be arranged downstream of the second LNT 272. The third emission control device 274 is an SCR in one example. Additionally or alternatively, the third emission control device 274 may be used similarly to the SCR 8 of FIG. 1. Herein, the third emission control device 274 is referred to as SCR 274. In some examples, additionally or alternatively, the injector 282 may be activated in response to an exhaust gas temperature being greater than a threshold temperature and the exhaust gas air/fuel ratio being rich. In one example, this injection demand may occur during a regeneration of the second LNT 272. As such, there may be engine conditions the injection demand is in response to SCR 274 conditions, independent of the second LNT 272.

Vehicle system 206 may further include control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 206. As another example, the actuators may include the throttle 262.

Controller 212 may be configured as a conventional microcomputer including a microprocessor unit, input/output ports, read-only memory, random access memory, keep alive memory, a controller area network (CAN) bus, etc. Controller 812 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Controller 212 may be used similarly to control unit 10 of FIG. 1.

In some examples, hybrid vehicle 206 comprises multiple sources of torque available to one or more vehicle wheels 259. In other examples, vehicle 206 is a conventional vehicle with only an engine, or an electric vehicle with only electric machine(s). In the example shown, vehicle 206 includes engine 210 and an electric machine 251. Electric machine 251 may be a motor or a motor/generator. A crankshaft of engine 210 and electric machine 251 may be connected via a transmission 254 to vehicle wheels 259 when one or more clutches 256 are engaged. In the depicted example, a first clutch 256 is provided between a crankshaft and the electric machine 251, and a second clutch 256 is provided between electric machine 251 and transmission 254. Controller 212 may send a signal to an actuator of each clutch 256 to engage or disengage the clutch, so as to connect or disconnect crankshaft from electric machine 251 and the components connected thereto, and/or connect or disconnect electric machine 251 from transmission 254 and the components connected thereto. Transmission 254 may be a gearbox, a planetary gear system, or another type of transmission. The powertrain may be configured in various manners including as a parallel, a series, or a series-parallel hybrid vehicle.

Electric machine 251 receives electrical power from a traction battery 261 to provide torque to vehicle wheels 259. Electric machine 251 may also be operated as a generator to provide electrical power to charge battery 261, for example during a braking operation.

Turning now to FIG. 3, it shows a method 300 for adjusting an air injection in response to conditions of a second LNT downstream of a first LNT during a DeSOx (e.g., a desulfation). Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

The method 300 begins at 302, which includes determining, estimating, and/or measuring one or more current engine operating parameters. The current engine operating parameters may include but are not limited to one or more of a manifold vacuum, throttle position, boost amount, vehicle speed, engine speed, engine temperature, and air/fuel ratio.

The method 300 proceeds to 304, which includes determining if one or more of the first LNT or the second LNT desires a $DeSO_x$. $DeSO_x$ may be desired if an amount of sulfur accumulated in the LNT is greater than a threshold amount of sulfur. The amount of sulfur accumulated may be tracked over time via data stored in a look-up table. The look-up table may be a multi-input look up table, wherein the inputs may include air/fuel ratio, engine temperature, $DeSO_x$ frequency, $DeSO_x$ length, and the like. Additionally or alternatively, the amount of sulfur accumulated may be estimated based on a sensed emission of nitrogen oxides, wherein the emission of nitrogen oxides may increase as the amount of sulfur accumulated increases.

If $DeSO_x$ is not desired and the amount of sulfur accumulated in both of the first LNT and the second LNT is less than the threshold amount of sulfur, then the method 300 proceeds to 306 to maintain current engine operating parameters and does not activate a $DeSO_x$ event.

If $DeSO_x$ is desired by one or more of the first LNT and the second LNT, then the method 300 proceeds to 308, which includes determining if a temperature of the first LNT is greater than or equal to a threshold $DeSO_x$ temperature. If it is not, then the method 300 proceeds to 306 as described above. In this way, the method 300 waits for engine operating conditions to passively increase a temperature of the first LNT to reach the threshold $DeSO_x$ temperature. The threshold $DeSO_x$ temperature may be a temperature at which sulfur-containing compounds are released from a washcoat of the LNT, thereby restoring catalytic functioning of the LNT.

If the temperature of the first LNT is greater than threshold DeSOx temperature, then the method 300 proceeds to 310, which includes determining if the second LNT is lit-off. The second LNT may be lit-off if a temperature of the second LNT is greater than a light-off temperature. In one example, the temperature of the second LNT is extrapolated from feedback from a temperature sensor positioned to sense a temperature of exhaust gas. In one example, temperature sensor 128 may be used to estimate a temperature of the second LNT. If the second LNT is lit-off, then the method 300 proceeds to 312, which includes initiating the $DeSO_x$ of the first LNT. As described above, the first LNT may be arranged closer to an engine than the second LNT. As such, the temperature gradient of the exhaust passage may be such that when the second LNT is lit-off the first LNT temperature is greater than the threshold $DeSO_x$ temperature. If the second LNT is not lit-off, then the method 300 proceeds to 306 as described above.

Following 312, the method 300 proceeds to 314, which includes determining if the second LNT temperature is greater than or equal to the threshold $DeSO_x$ temperature. If the second LNT temperature is greater than or equal to the threshold $DeSO_x$ temperature, then the method 300 proceeds to 316 which includes initiating the $DeSO_x$ of the second LNT without injecting air. The method 300 may further includes maintaining current engine operating conditions until $DeSO_x$ is no longer desired (e.g., until the amount of sulfur accumulated is less than the threshold sulfur amount). $DeSO_x$ of the second LNT may include a rich engine operation, wherein $DeSO_x$ of the second LNT includes extending a rich slip from the first LNT, in order to allow the $DeSO_x$ of the second LNT. This operating conditions is maintained until the sulfur load in both LNTs has fallen below the threshold sulfur amount.

Returning to 314, if the temperature of the second LNT is lower than the threshold DeSOx temperature, the method 300 proceeds to step 318, which comprises increasing an air injection rate to increase an air/fuel ratio upstream of the second LNT to $\geq 1$. By injecting air into the exhaust passage, the reductants in the exhaust gas, such as hydrocarbons and carbon monoxide, may exothermically react with the oxygen on the second LNT catalyst surface and give off heat. The heat produced may more rapidly heat the second LNT to the threshold DeSOx temperature. In one example, an air supply rate of the injecting air may be based on the air/fuel ratio. For example, the air supply rate may be set to dilute the rich exhaust gas to a stoichiometric air/fuel ratio or a lean air/fuel ratio so that nitrogen oxides stored on the second LNT are not desorbed as the second LNT reaches its threshold DeSOx temperature. As such, as the air/fuel ratio is adjusted to a richer air/fuel ratio, the air supply rate may increase. In one example, the air/fuel ratio may be adjusted to a richer air/fuel ratio to increase heat production during the exothermic reaction. This may be desired based on a difference between the second LNT temperature and the threshold DeSOx temperature. As an example, as the difference between the second LNT temperature and the threshold DeSOx temperature increases, more heat may be desired to warm-up the second LNT. As such, the air/fuel ratio may be adjusted to a richer air/fuel ratio, which may also result in the air supply rate being increased to a higher air supply rate.

The method 300 proceeds to 320, which includes determining if the second LNT temperature is greater than or equal to the threshold $DeSO_x$ temperature. If the second LNT temperature is not greater than or equal to the threshold $DeSO_x$ temperature, the method 300 comprises continuing the rich operation with air being injecting until the second LNT reaches the DeSOx temperature. Once the second LNT temperature is greater than the threshold $DeSO_x$ temperature, the method 300 proceeds to 322 to deactivate the air injection as the second LNT no longer desires to be warmed up. Additionally, rich exhaust gas may now reach the second LNT and the initiation of the $DeSO_x$ of the second LNT may begin. Thus, the method 300 proceeds to 316 following 322.

Turning now to FIG. 3B, it shows a method 350 for adjusting the air injector to improve the regeneration efficiency of the second LNT. The method 350 begins at 352, which includes determining, estimating, and/or measuring one or more current engine operating parameters. The current engine operating parameters may include but are not limited to one or more of a manifold vacuum, throttle position, boost amount, vehicle speed, engine speed, engine temperature, and air/fuel ratio.

The method 352 proceeds to 354, which includes determining if a second LNT has lit off. This may be similar to 306 of method 300 of FIG. 3A. If the second LNT is not lit off, then the method 350 proceeds to 356 to continue monitoring the second LNT temperature.

If the second LNT is lit-off, then the method 350 proceeds to 358 to determine if the first LNT is being regenerated. If the first LNT is being regenerated, then an air/fuel ratio of exhaust gas flowing to the second LNT may be rich while an exhaust gas temperature may be below a regeneration temperature of the second LNT during a beginning of the first LNT regeneration, which may result in increased emissions. If the first LNT is not being regenerated, then the method 350 proceeds to 360 to maintain current engine operating parameters and does not activate the air injector to inject air.

If the first LNT is being regenerated, then the method 350 proceeds to 362 to determine if the temperature of the second LNT is equal or higher than a threshold regeneration temperature. The threshold regeneration temperature may correspond to a temperature of the second LNT where rich exhaust gases may be used to reduce nitrogen oxides stored in the second LNT. In one example, the threshold regeneration temperature is greater than the light-off temperature of the second LNT.

If the second LNT temperature is greater than the threshold regeneration temperature, then the method 350 proceeds to 364 to determine if the second LNT temperature is greater than an upper threshold temperature and/or a first threshold temperature. The upper threshold temperature may be based on a non-zero, positive integer, wherein the upper threshold temperature is greater than the light-off temperature and the regeneration temperature, in one example. In one example, the upper threshold temperature is based on a temperature where nitrogen oxides storage capacity of the LNT is decreased. In one example, the upper threshold temperature is based on a temperature where degradation of the second LNT may occur. If the second LNT temperature is not greater than the upper threshold temperature, then the method 350 proceeds to 360 to maintain current engine operating parameters and does not inject air.

If the second LNT temperature is greater than the upper threshold temperature, then the method 350 proceeds to 366, which includes determining if the air/fuel ratio is greater than or equal to lambda value of 1 (e.g., if the air/fuel ratio is stoichiometric or lean). If the air/fuel ratio is not stoichiometric or lean, then the method 350 proceeds to 360 and does not inject air since injecting air would further increase the second LNT temperature.

If the air/fuel ratio is stoichiometric or lean, which may be occur if the first LNT regeneration is complete or if engine air/fuel ratio is leaned due to driver demand or other conditions, then the method 350 proceeds to 368, which includes injecting air until the second LNT temperature is less than the upper threshold temperature. In one example, the air supply rate is set to a highest rate to decrease the second LNT temperature quickly. In other examples, the air supply rate may be set to a rate based on a difference between the second LNT temperature and the upper threshold temperature, wherein as the difference increase the air supply rate increases. The injection may be deactivated once the second LNT temperature is less than the upper threshold temperature.

Returning to 362, if the second LNT temperature is not greater than or equal to the threshold regeneration temperature, then the method 350 proceeds to 370, which includes adjusting an air/fuel ratio to a rich air/fuel ratio. That is to say, the air/fuel ratio may be adjusted to increase rich slip through the first LNT so that rich exhaust gases are present between the first LNT and the second LNT.

The method 350 proceeds to 372, which includes injecting air into the exhaust passage. The air injection rate may be set to a value corresponding to an air/fuel ratio sensed downstream of the first LNT and upstream of the second LNT. In one example, the air injection rate is set to increase the rich air/fuel ratio downstream of the first LNT to a stoichiometric or lean air/fuel ratio, to mitigate leakage of reductants in the exhaust gas flow through the second LNT. In this way, the first LNT may be regenerated via rich exhaust gases, wherein the rich exhaust gases are leaned upstream of the second LNT to block rich exhaust gases from being present downstream of the second LNT until the exhaust gas temperature is above the regeneration temperature of the second LNT.

By injecting air, the exhaust gas temperature may more quickly reach the threshold regeneration temperature of the second LNT as the air reacts with the reducing agents and produces an exothermic reaction. As such, a period of time in which air is injected during the regeneration of the first LNT may be relatively short.

The method 350 proceeds to 374, deactivating the air injection once the second LNT temperature is greater than the threshold regeneration temperature. As such, the first and second LNTs may be regenerated together. It will be appreciated that to regenerate the second LNT, rich exhaust gases breakthrough the first LNT to promote desorption of nitrogen oxides stored on the second LNT. As such, the first LNT may be fully regenerated before the second LNT, which may result in a backfill of rich exhaust gases upstream of the second LNT. That is to say, the exhaust passage may be filled with rich exhaust gas, wherein may be equal to an amount of rich exhaust gas more than desired to regenerate the second LNT. Thus, in one example, an air injection may be desired following completion of the second LNT regeneration to lean rich exhaust gases already present in the exhaust passage. Completion of the second LNT regeneration may be determined via monitoring a load of the second LNT, sensing rich exhaust gas breakthrough of the second LNT, and/or following a duration of time. Additionally or alternatively, the method 350 may proceed to 360 following 374 to maintain current engine operating parameters and does not inject air.

Turning now to FIG. 4, it shows a method 400 for adjusting the air injector in response to a demand from an SCR. The method 400 begins at 402, which includes determining, estimating, and/or measuring one or more current engine operating parameters. The current engine operating parameters may include but are not limited to one or more of a manifold vacuum, throttle position, boost amount, vehicle speed, engine speed, engine temperature, and air/fuel ratio.

The method 400 proceeds to 404, which includes determining if a second LNT regeneration is requested. The second LNT regeneration may be requested in response to a second LNT load exceeding a threshold load. Additionally, the second LNT regeneration may be requested only if the LNT temperature exceeds a light-off temperature. Additionally or alternatively, the second LNT regeneration may be requested periodically, with a fixed time interval elapsing between regenerations. If the second LNT regeneration is not requested, then the method 400 proceeds to 406 to maintain current engine operating parameters and does not inject air or adjust an engine air/fuel ratio.

If the second LNT regeneration is requested, then the method 400 proceeds to 408, to decrease an engine air/fuel ratio to a rich air/fuel ratio. In one example, the second LNT regeneration may be an active regeneration wherein the engine operating parameters are intrusively adjusted outside of a driver demand or other input. As such, the air/fuel ratio decreases to a rich air/fuel ratio, wherein the rich exhaust gas comprising hydrocarbons and carbon monoxide is used to promote desorption of nitrogen oxides from the second LNT.

The method 400 proceeds to 410, which includes determining if the exhaust gas temperature is greater than a second threshold temperature. The second threshold temperature may be based on a temperature of exhaust gas that may degrade the SCR downstream of the second LNT if the exhaust gas is rich. In one example, the second threshold temperature is less than the first threshold temperature introduced above with respect to FIG. 3.

If the exhaust gas temperature is not greater than the second threshold temperature, then the method 400 proceeds to 406 to maintain current engine operating parameters and does not inject air.

If the exhaust gas temperature is greater than the second threshold temperature, then the method 400 proceeds to adjusting an air injection rate to block rich exhaust gas from reaching the SCR. In one example, the air injection rate adjusts an air/fuel ratio of exhaust gas flowing to the second LNT to a less rich air/fuel ratio. As such, rich exhaust gas may still reach the second LNT, however, after passing through the second LNT, where hydrocarbon and carbon monoxide may react with nitrogen oxides stored on the second LNT, the exhaust gas may be leaned to stoichiometric or lean air/fuel ratios. As such, even though the exhaust gas temperature may increase due to the air injection, the exhaust gas may no longer be rich as it flows to the SCR device, thereby increasing a longevity of the SCR device as the second LNT is regenerated. In one example, the air injection rate may be increased as the second LNT regeneration progresses due to the desorption of nitrogen oxides from the second LNT. In this way, the exhaust gas exiting the second LNT may be less lean as nitrogen oxides are desorbed from the second LNT. By increasing the air injection rate as the second LNT load decreases, the exhaust gas may be sufficiently leaned to block rich exhaust gas from reaching the SCR. The injection may continue until the temperature of exhaust gas falls below the second threshold temperature or completion of the second LNT regeneration.

Turning now to FIG. 5, it shows a graph 500 illustrating a prophetic engine operating sequence illustrating adjustments to a variety of operating parameters in response to sensed conditions. Plot 510 illustrates an engine air/fuel ratio and dashed line 512 illustrates a stoichiometric air/fuel ratio. Plot 520 illustrates a second LNT load and dashed line 522 illustrates a threshold load. Plot 530 illustrates an air supply rate. Plot 540 illustrates an air/fuel ratio downstream of a first LNT and upstream of the second LNT. Dashed line 542 illustrates a stoichiometric air/fuel ratio. Plot 550 illustrates an exhaust gas temperature of exhaust gas downstream of the first LNT and upstream of the second LNT. Dashed line 552 illustrates a second LNT $DeSO_x$ temperature, dashed line 553 illustrates a threshold regeneration temperature, dashed line 554 illustrates a second threshold temperature, and dashed line 556 illustrates a first threshold temperature (e.g., an upper threshold temperature). Plot 560 illustrates an air/fuel ratio downstream of the second LNT and dashed line 562 illustrates a stoichiometric air/fuel ratio. Time increase from a left to a right side of the figure.

Prior to t1, the engine air/fuel ratio (plot 510) is at or slightly above stoichiometric (dashed line 512). As such, the air/fuel ratios to the second LNT (plot 540) and after the second LNT (plot 550) are at or slightly above stoichiometric (dashed lines 542 and 562, respectively). The second LNT load (plot 520) is less than the threshold load (dashed line 522). The air supply rate is relatively low (plot 530). In one example, a relatively low air supply rate is equal to substantially 0. As such, the injector may be deactivated and not injecting air when the air supply rate is relatively low. The exhaust gas temperature (plot 550) is below the second LNT $DeSO_x$ temperature (dashed line 552). In one example, the second LNT desires a $DeSO_x$ due to an amount of sulfur accumulated in the second LNT being greater than a threshold sulfur amount.

At t1, the engine air/fuel ratio is adjusted to a rich air/fuel ratio. The injector is activated to inject air. As such, the air supply rate is increased toward a relatively high air supply rate. Between t1 and t2, the exhaust gas temperature begins to increase as air from the injector reactants with constituents in the rich exhaust gas. In one example, the air supply rate is set to rate such that the rich exhaust gas is leaned prior to reaching the second LNT. As such, the air/fuel ratio to the second LNT is at or above the stoichiometric air/fuel ratio. In this way, the second LNT temperature may increase toward the threshold $DeSO_x$ temperature.

At t2, the exhaust gas temperature increases to a temperature greater than the threshold $DeSO_x$ temperature and the second LNT is desulfated. The engine air/fuel ratio may be returned to a stoichiometric or lean air/fuel ratio and the air supply rate may be reduced to the relatively low air supply rate. As such, the air injector may be deactivated. Between t2 and t3, the engine air/fuel ratio is rich and the air/fuel ratio to the second LNT is also rich as the second LNT is desulfated. Once the desulfation (e.g., $DeSO_x$) is complete (e.g., the amount of sulfur is less than the threshold sulfur amount), the engine air/fuel ratio and the air/fuel ratio to the second LNT are increased to at or above the stoichiometric air/fuel ratio. The second LNT load increases toward the threshold load following the $DeSO_x$ as it is now more catalytically active. The exhaust gas temperature increases.

At t3, the engine air/fuel ratio is reduced to a rich air/fuel ratio to regenerate a first LNT. The air supply rate is increased to a relatively high air supply rate as the injector is activated. The injector is activated due to the exhaust gas temperature being less than the regeneration temperature (dashed line 553). As such, if the injector was not activated, rich exhaust gases would flow out of the second LNT and to an ambient atmosphere, which may be undesired. By activating the injector, the exhaust gases may be leaned to stoichiometric or lean air/fuel ratios, which may block the expulsion of rich exhaust gases from the vehicle. Between t3 and t4, the first LNT regeneration is executed. The air fuel ratio to and after the second LNT is at or above stoichiometric as the injected air leans the exhaust gas downstream of the first LNT for a beginning portion of the first LNT regeneration. Once the exhaust gas temperature increases to a temperature greater than the regeneration temperature, the air supply rate is decreased to a relatively low rate and the injector is deactivated. In this way, the first LNT and the second LNT may be regenerated in tandem.

It will be appreciated that the exhaust gas may be leaned during engine operating conditions outside of the first LNT regeneration. Such engine operating conditions may include where exhaust temperatures are relatively low and a conversion efficiency of the SCR is relatively low, as such, it may be undesired to desorb nitrogen oxides from the second LNT as the nitrogen oxides may not be fully reduced. By injecting air, rich operation of the engine may be extended without concern for undesired desorption of nitrogen oxides from the second LNT.

Additionally or alternatively, in some examples, the injector may remain activated during a duration of the first LNT regeneration such that only the first LNT is regenerated and the second LNT is not. It may be desired to not regenerate the second LNT if an SCR device downstream of the second LNT is unable to capture ammonia flowing therefrom, which may occur if the SCR is fully saturated with ammonia. Additionally or alternatively, if the SCR temperature is relatively low, then it may not be able to reduce nitrogen oxides desorbed from the second LNT, which also may lead to the second LNT regeneration being undesired.

At t4, the first LNT regeneration is complete. The engine air/fuel ratio is returned to a stoichiometric or higher air/fuel ratio. As described above, the injector may be activated following completion of the first LNT regeneration due to the portion of the exhaust passage between the engine and the second LNT being filled with rich exhaust gas. This amount of rich exhaust gas may be more than an amount desired to complete regeneration of the second LNT. As such, the air supply rate may increase in response to the first LNT regeneration being complete to mitigate breakthrough of rich exhaust gas from the second LNT. Between t4 and t5, the exhaust gas temperature increases to a temperature greater than the first threshold temperature.

At t5, the air supply rate is increased to a relatively high air supply rate and the injector is activated. Air is injected into the portion of the exhaust passage between the first LNT and the second LNT to cool the second LNT. Air may be used to cool the second LNT due to the engine air/fuel ratio being at or above stoichiometric. As such, an exothermic reaction may not occur due to air being injected and mixing with exhaust gas.

Between t5 and t6, the air supply rate continues. The exhaust gas temperature decreases to a temperature less than the first threshold temperature, thereby mitigating a likelihood of degradation to the second LNT. Plot 558 illustrates a temperature of exhaust gas flowing to the second LNT while plot 550 may represent an exhaust gas temperature upstream of the injector. The injector may remain active until the exhaust gas temperature of plot 550 falls below the first threshold temperature. In one example, the air supply rate is set to a rate based on a difference between the exhaust gas temperature of plot 550 and the first threshold temperature, wherein as the difference increases, the air supply rate is proportionally increased. As shown, the air fuel ratios to and after the second LNT are leaner than the engine air/fuel ratio due to the injection of air. At t6, the exhaust gas temperature of plot 550 falls below the first threshold temperature and the air supply rate is reduced to a relatively low air supply rate and the injector is deactivated.

Between t6 and t7, an amount of time passes and the vehicle is driven.

Between t7 and t8, the engine air/fuel ratio is at or above stoichiometric and the second LNT load increases toward the threshold load. The exhaust gas temperature is greater than the second threshold temperature and less than the first threshold temperature. At t8, the second LNT load increases to a load greater than the threshold load, thereby signaling a second LNT regeneration request. As such, the engine air/fuel ratio is reduced to a rich air/fuel ratio to begin the second LNT regeneration. Between t8 and t9, the second LNT regeneration is executed. The engine air/fuel ratio is rich and the second LNT load begins to decrease. However, due to the exhaust gas temperature being greater than the second threshold temperature, it may be undesired to flow rich exhaust gas to the SCR device. As such, the injector is activated and the air supply rate is set to a rate between relatively low and relatively high rates. In one example, the air supply rate is set to a rate such that exhaust gas flowing to the second SCR is rich while exhaust gas leaving the second SCR is stoichiometric or lean. By doing this, an air injector downstream of the second SCR may be omitted, thereby decreasing manufacturing costs and packaging constraints. Furthermore, degradation to the SCR may be mitigated, thereby increasing its longevity.

The air supply rate may increase between t8 and t9 as the second LNT load decreases. The air supply rate may increase inversely relative to the second LNT load due to fewer exhaust gas constituents being utilized to desorb LNT constituents. As such, more air is needed to lean the exhaust gas. As such, the air/fuel ratio to the second LNT increases toward stoichiometric as the second LNT regeneration progresses. Additionally or alternatively, the air supply rate may be set to a rate based on the exhaust gas temperature. As shown, the exhaust gas temperature may increase toward the first threshold temperature. As such, the air supply rate is set to a rate to lean exhaust gas downstream of the second LNT while avoiding increasing the exhaust gas temperature of exhaust gas flowing to the second LNT to a temperature greater than the first threshold temperature. In one example, if the air supply rate cannot be set to a rate that both avoids increasing the exhaust temperature to a temperature higher than the first threshold rate and leans the exhaust gas flow downstream of the second LNT, then the second LNT regeneration may be aborted.

At t9, the second LNT regeneration is complete. The engine air/fuel ratio is returned to a stoichiometric or lean air/fuel ratio. The injector is deactivated and the air supply rate is reduced to a relatively low air supply rate. After t9, the engine air/fuel ratio remains at or above stoichiometric and the air supply rate remains relatively low.

In this way, an air supply device may be arranged in an exhaust passage comprising a first LNT upstream of a second LNT. The air supply device may be arranged between the first LNT and the second LNT, wherein the air supply device may be configured to lean exhaust gas and/or cool and/or heat exhaust gas flowing to the second LNT. The technical effect of adjusting the exhaust gas composition or temperature to the LNT is to extend a regeneration and/or rich engine operation of the engine without desorbing nitrogen oxides from the second LNT. Furthermore, the injector may accelerate a light-off of the second LNT during some engine conditions while decreasing a temperature of the second LNT during other engine conditions. The air supply device may be further configured to extend a second LNT regeneration during conditions where the rich exhaust gas is relatively hot and may degrade an SCR device arranged downstream of the second LNT.

In another representation, an arrangement for the accommodation and post-treatment of an exhaust gas stream produced by an internal combustion engine, comprises a dual-LNT catalytic converter having a first LNT catalytic converter unit and a second LNT catalytic converter unit arranged downstream of the first LNT catalytic converter unit, a lambda sensor arranged downstream of the first LNT catalytic converter unit and upstream of the second LNT catalytic converter unit, and an air supply device arranged downstream of the first LNT catalytic converter unit and upstream of the second LNT catalytic converter unit.

A first example of the arrangement further includes where an SCR catalytic converter is arranged downstream of the second LNT catalytic converter unit.

A second example of the arrangement, optionally including the first, further includes where one or more exhaust gas post-treatment devices is arranged downstream of the first LNT catalytic converter unit and upstream of the second LNT catalytic converter unit and/or downstream of the SCR catalytic converter.

A third example of the arrangement including any of the examples above further includes where exhaust gas post-treatment devices are arranged downstream of the lambda sensor and upstream or downstream of the air supply device.

A fourth example of the arrangement including any of the examples above further includes where a temperature sensor arranged upstream or downstream of the second LNT catalytic converter unit.

A fifth example of the arrangement including any of the examples above further includes where a control unit, which is configured and designed to output a control signal to the internal combustion engine and/or the air supply device in dependence on sensor signals of the lambda sensor and/or the temperature sensor.

Further comprising where any one or all of the examples above are arranged in a hybrid vehicle A sixth example of the arrangement including any of the examples above further includes where the second LNT catalytic converter unit is arranged in the region of the underbody of the motor vehicle.

In another representation, a method for treating of an exhaust gas stream produced by an internal combustion engine, comprises conducting the exhaust gas stream through a first LNT catalytic converter unit of a dual-LNT catalytic converter, ascertaining the combustion air ratio λ in the exhaust gas stream downstream of the first LNT catalytic converter unit and upstream of a second LNT catalytic converter unit, which is arranged downstream of the first LNT catalytic converter unit, of the dual-LNT catalytic converter, supplying air to the exhaust gas stream downstream of the first LNT catalytic converter unit and upstream of the second LNT catalytic converter unit, and conducting the exhaust gas stream through the second LNT catalytic converter unit.

A first example of the method further includes conducting the exhaust gas stream through an SCR catalytic converter arranged downstream of the second LNT catalytic converter unit.

A second example of the method optionally including the first example further includes treating the exhaust gas stream in one or more exhaust gas post-treatment devices arranged downstream of the first LNT catalytic converter unit and upstream of the second LNT catalytic converter unit and/or downstream of the SCR catalytic converter.

A third example of the method, optionally including any of the examples above, further includes ascertaining the temperature of the exhaust gas stream upstream of the second LNT catalytic converter unit.

A fourth example of the method including any of the examples above further includes where quantity of air to be supplied to the exhaust gas stream is controlled or regulated in dependence on the ascertained combustion air ratio λ and/or in dependence on the ascertained temperature.

A fifth example of the method including any of the examples above further includes where quantity of air to be supplied to the exhaust gas stream is controlled or regulated such that the exhaust gas stream reaching the second LNT catalytic converter unit at least temporarily has a combustion air ratio λ≥1.

A sixth example of the method optionally including any of the examples above further includes where a ratio of air to fuel in an air-fuel mixture to be supplied to the internal combustion engine is controlled or regulated in dependence on the ascertained combustion air ratio λ and/or in dependence on the ascertained temperature.

An embodiment of a system comprises a first lean $NO_x$ trap arranged upstream of a second lean $NO_x$ trap in an exhaust passage, an air supply device arranged between the first and second lean $NO_x$ traps, and a controller with computer-readable instructions stored on non-transitory memory thereof that when executed enable the controller to adjust an air flow from the air supply device during a regeneration of the first lean $NO_x$ trap. A first example of the system further includes where the air supply device comprises an injector positioned to inject directly into a portion of the exhaust passage downstream of an exhaust gas sensor arranged between the first and second lean $NO_x$ traps, wherein a rate of the air flow of the air supply device is based on a difference between a lambda value of the exhaust gas and a stoichiometric lambda value to block rich exhaust gas from passing through the second lean $NO_x$ trap. A second example of the system, optionally including the first example, further includes where the instructions further enable the controller to adjust the air flow from the air supply device and adjust an engine air/fuel ratio to a rich air/fuel ratio in response to the second lean $NO_x$ trap not being lit-off. A third example of the system, optionally including the first and/or second examples, further includes where a rate of the air flow is based on the rich air/fuel ratio, and where the rate increases an exhaust gas air/fuel ratio between the air supply device and the second lean $NO_x$ trap to a lean air/fuel ratio. A fourth example of the system, optionally including one or more of the first through third examples, further includes where the second lean $NO_x$ trap is in a far-underbody position. A fifth example of the system, optionally including one or more of the first through fourth examples, further includes where a selective catalytic reduction device is arranged downstream of the second lean $NO_x$ trap. A sixth example of the system, optionally including one or more of the first through fifth examples, further includes where the instructions further enable the controller to adjust the air flow in response to the second lean $NO_x$ trap being regenerated with a rich exhaust gas, wherein a temperature of the rich exhaust gas is greater than a threshold temperature. A seventh example of the system, optionally including one or more of the first through sixth examples, further includes where a rate of the air flow adjusts the rich exhaust gas to be less rich, wherein the exhaust gas downstream of the second lean $NO_x$ trap device is lean.

An embodiment of an engine system comprises an exhaust passage fluidly coupled to an engine, the exhaust passage housing a first LNT upstream of a second LNT, and a SCR device arranged downstream of the second LNT, an injector positioned to inject air directly into a portion of the exhaust passage between the second LNT and an exhaust gas sensor, and a controller with computer-readable instructions stored on non-transitory memory thereof that when executed enable the controller to adjust an engine air/fuel ratio to a rich air/fuel ratio and an air flow rate of the injector in response to a temperature of the second LNT being less than a light-off temperature. A first example of the engine system further includes where the air flow rate is based on the rich air/fuel ratio, and where an air/fuel ratio of exhaust gas between the injector and the second LNT is equal to a lean air/fuel ratio. A second example of the engine system, optionally including the first example, further includes where the instructions further enable the controller to adjust the engine air/fuel ratio to the rich air/fuel ratio and the air flow rate of the injector in response to a second LNT regeneration request. A third example of the engine system, optionally including the first and/or second examples, further includes where the air flow rate is based on the rich air/fuel ratio and a load of the second LNT, and where an air/fuel ratio of exhaust gas between the injector and the second LNT is less rich than the engine air/fuel ratio and where an air/fuel ratio of exhaust gas downstream of the second LNT is a lean air/fuel ratio. A fourth example of the engine system, optionally including one or more of the first through third examples, further includes where the air flow rate is increased as the load of the second LNT decreases as a regeneration of the second LNT progresses. A fifth example of the engine system, optionally including one or more of the first through fourth examples, further includes where the instructions further enable the controller to adjust the air flow rate in response to the rich air/fuel ratio to increase the air/fuel ratio between the injector and the second LNT to a stoichiometric air/fuel ratio. A sixth example of the engine system, optionally including one or more of the first through fifth examples, further includes where the instructions further enable the controller to adjust the air flow rate in response a temperature of the second LNT exceeding a threshold temperature, wherein the air flow rate is based on a difference between the temperature of the second LNT and the threshold temperature, wherein as the difference increases the air flow rate increases. A seventh example of the engine system, optionally including one or more of the first through sixth examples, further includes where the engine air/fuel ratio is lean.

An embodiment of a method comprises injecting air from an injector of an air supply device positioned to inject between a first LNT and a second LNT in response to the first LNT being regenerated and injecting air from the injector in response to a temperature of the second LNT being less than a light-off temperature. A first example of the method further includes where injecting air further comprising adjusting an air supply rate of the injector based on an air/fuel ratio of exhaust gas between the first LNT and the second LNT, and where the air supply rate increases as a difference between the air/fuel ratio and a stoichiometric air/fuel ratio increases. A second example of the method, optionally including the first example, further includes where injecting air from the injector in response to the temperature of the second LNT being greater than a threshold temperature. A third example of the method, optionally including the first and/or second examples, further includes where adjusting an air supply rate of the injector based on an air/fuel ratio of exhaust gas between the first LNT and the second LNT in response to the temperature of the second LNT being less than the light-off temperature, further comprising adjusting the air supply rate of the injector based on a difference between the temperature of the second LNT and the threshold temperature, wherein the air supply rate increases as the difference increases.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a first lean $NO_x$ trap arranged upstream of a second lean $NO_x$ trap in an exhaust passage;
an air injector arranged between the first and second lean $NO_x$ traps;
a selective catalytic reduction device arranged downstream of the second lean $NO_x$ trap; and
a controller with computer-readable instructions stored on non-transitory memory thereof that when executed enable the controller to:
adjust an air flow from the air injector during a regeneration of the first lean $NO_x$ trap; and
adjust the air flow during the regeneration of the second lean $NO_x$ trap with a rich exhaust gas in response to a temperature of the rich exhaust gas being greater than a threshold temperature.

2. The system of claim 1, wherein the air injector is positioned to inject air directly into a portion of the exhaust passage downstream of an exhaust gas sensor arranged between the first and second lean $NO_x$ traps, wherein a rate of the air flow of the air injector is based on a difference between a lambda value of an exhaust gas and a stoichiometric lambda value to block the rich exhaust gas from passing through the second lean $NO_x$ trap during the regeneration of the first lean $NO_x$ trap.

3. The system of claim 1, wherein the instructions further enable the controller to adjust the air flow from the air injector and adjust an engine air/fuel ratio to a rich air/fuel ratio in response to the second lean $NO_x$ trap requesting a desulfation, wherein the air flow is adjusted to lean an exhaust gas air/fuel ratio exiting the second lean $NO_x$ trap.

4. The system of claim 3, wherein the air flow increases as a load of the second lean $NO_x$ trap decreases during the regeneration of the second lean $NO_x$ trap when the temperature of the rich exhaust gas is greater than the threshold temperature.

5. The system of claim 1, wherein the second lean $NO_x$ trap is in a far-underbody position.

6. The system of claim 1, wherein the air injector is the only air injector of the exhaust passage, and wherein another air injector is not arranged between the second lean $NO_x$ trap and the selective catalytic reduction device.

7. The system of claim 1, wherein a rate of the air flow during the regeneration of the second lean NOx trap adjusts the rich exhaust gas to be less rich upstream of the second lean $NO_x$ trap, wherein the exhaust gas downstream of the second lean $NO_x$ trap device is lean.

8. An engine system comprising:
an exhaust passage fluidly coupled to an engine, the exhaust passage housing a first LNT upstream of a second LNT, and a SCR device arranged downstream of the second LNT;
an injector positioned to inject air directly into a portion of the exhaust passage between the first LNT, the second LNT, and an exhaust gas sensor; and
a controller with computer-readable instructions stored on non-transitory memory thereof that when executed enable the controller to:
adjust an engine air/fuel ratio to a rich air/fuel ratio and an air flow rate of the injector in response to a temperature of the second LNT being greater than a threshold temperature, wherein the air flow rate increases as a load of the second LNT decreases.

9. The engine system of claim 8, wherein the air flow rate is further based on the rich air/fuel ratio, and wherein an air/fuel ratio of exhaust gas between the injector and the second LNT is adjusted to equal to a lean air/fuel ratio via an air injection during a regeneration of the first LNT.

10. The engine system of claim 8, wherein the instructions further enable the controller to adjust the engine air/fuel ratio to the rich air/fuel ratio and the air flow rate of the injector in response to a second LNT regeneration request.

11. The engine system of claim 10, wherein an air/fuel ratio of exhaust gas flowing to the second LNT is rich but less rich than the engine air/fuel ratio via the air flow rate, and wherein an air/fuel ratio of exhaust gas downstream of the second LNT is a lean air/fuel ratio.

12. The engine system of claim 11, wherein the air/fuel ratio of exhaust gas flowing to the second LNT is increased toward a stoichiometric air/fuel ratio as the load of the second LNT decreases, and wherein the air/fuel ratio to the selective catalytic device remains equal to the lean air/fuel ratio.

13. The engine system of claim 8, wherein the instructions further enable the controller to adjust the air flow rate to zero in response to the temperature of the second LNT being greater than or equal to a threshold $DeSO_x$ temperature, wherein the threshold $DeSO_x$ temperature is less than the threshold temperature.

14. The engine system of claim 8, wherein the instructions further enable the controller to adjust the air flow rate in response a temperature of the second LNT exceeding the threshold temperature in response to an air/fuel ratio sensed between the first LNT and the second LNT being less than 1, wherein the air flow rate is based on a difference between the temperature of the second LNT and the threshold temperature, wherein as the difference increases the air flow rate increases.

15. The engine system of claim 14, wherein the air/flow rate is reduced to zero in response to the temperature of the second LNT falling below the threshold temperature.

16. A method comprising:
injecting air from an injector of an air supply device positioned to inject between a first LNT and a second LNT in response to the first LNT being desulfated; wherein
the injecting air from the injector is in response to a temperature of the second LNT being less than a threshold $DeSO_x$ temperature; and
injecting air from the injector in response to the temperature of the second LNT being greater than an upper threshold temperature, which is greater than the threshold $DeSO_x$ temperature, wherein an air supply rate is based on a difference between the temperature of the second LNT and the upper threshold temperature.

17. The method of claim 16, wherein injecting air further comprises adjusting the air supply rate of the injector based on an air/fuel ratio of exhaust gas between the first LNT and the second LNT, and wherein the air supply rate increases as a difference between the air/fuel ratio and a stoichiometric air/fuel ratio increases.

18. The method of claim 16, further comprising deactivating the injector to no longer inject air in response to the temperature of the second LNT being greater than the threshold $DeSO_x$ temperature.

* * * * *